United States Patent
Wilkins

(10) Patent No.: US 8,255,464 B2
(45) Date of Patent: Aug. 28, 2012

(54) CONTACT MANAGEMENT SYSTEM AND METHOD

(76) Inventor: John T. Wilkins, Danville, CA (US)

( * ) Notice: Subject to any disclaimer, the term of this patent is extended or adjusted under 35 U.S.C. 154(b) by 379 days.

(21) Appl. No.: 11/431,886

(22) Filed: May 9, 2006

(65) Prior Publication Data

US 2007/0266118 A1 Nov. 15, 2007

(51) Int. Cl.
*G06F 15/16* (2006.01)
(52) U.S. Cl. ...................................................... 709/206
(58) Field of Classification Search ................. 709/206, 709/217–219; 707/104.1; 705/1
See application file for complete search history.

(56) References Cited

U.S. PATENT DOCUMENTS

| | | | |
|---|---|---|---|
| 5,659,596 A | 8/1997 | Dunn | |
| 5,737,726 A * | 4/1998 | Cameron et al. | 705/7 |
| 5,963,951 A * | 10/1999 | Collins | 707/102 |
| 6,094,573 A | 7/2000 | Heinonen et al. | |
| 6,269,369 B1 * | 7/2001 | Robertson | 707/10 |
| 6,374,259 B1 * | 4/2002 | Celik | 707/104.1 |
| 6,393,421 B1 * | 5/2002 | Paglin | 707/9 |
| 6,654,768 B2 | 11/2003 | Celik | |
| 6,694,353 B2 | 2/2004 | Sommerer | |
| 6,701,348 B2 | 3/2004 | Sommerer | |
| 6,760,727 B1 * | 7/2004 | Schroeder et al. | 707/10 |
| 6,820,204 B1 * | 11/2004 | Desai et al. | 726/6 |
| 6,883,000 B1 * | 4/2005 | Gropper | 707/10 |
| 7,080,103 B2 * | 7/2006 | Womack | 707/616 |
| 7,110,773 B1 | 9/2006 | Wallace et al. | |
| 7,533,126 B2 * | 5/2009 | Oran | 707/104.1 |
| 7,668,144 B2 * | 2/2010 | Taylor et al. | 370/338 |
| 7,933,587 B1 * | 4/2011 | Swan | 455/412.1 |
| 2001/0032089 A1 * | 10/2001 | Schiller | 705/1 |
| 2002/0016857 A1 * | 2/2002 | Harari | 709/238 |
| 2004/0024846 A1 * | 2/2004 | Randall et al. | 709/219 |
| 2005/0124320 A1 | 6/2005 | Ernst et al. | |
| 2005/0192000 A1 * | 9/2005 | Lloyd | 455/420 |

OTHER PUBLICATIONS

Serial No. TDB0901.0055, "e-business Card System", Software Patent Institute Database of Software Technologies, Software Patent Institute, 2003, 2 pages.
Serial No. TDB1093.0202, "Coded Business Cards", Software Patent Institute Database of Software Technologies, Software Patent Institute, 2003, 2 pages.
Search Report and Written Opinion dated Jul. 7, 2008.

\* cited by examiner

*Primary Examiner* — Faruk Hamza
*Assistant Examiner* — Benjamin Ailes

(57) ABSTRACT

A computer-implemented contact management method includes creating a contact record in a contact management system, generating a unique serial number corresponding to the contact record, conveying the serial number to a recipient, entering, by the recipient, the serial number into an internet-enabled computer application, requesting, by the application, the record from the contact management system corresponding to the serial number, and receiving data associated with the contact record. The received contact data may be automatically updated through an update function. A contact management system includes a data storage and a contact management server. A plurality of internet-enabled computer applications associated to the same user account may receive the same information using a synchronization function without further user input.

12 Claims, 10 Drawing Sheets

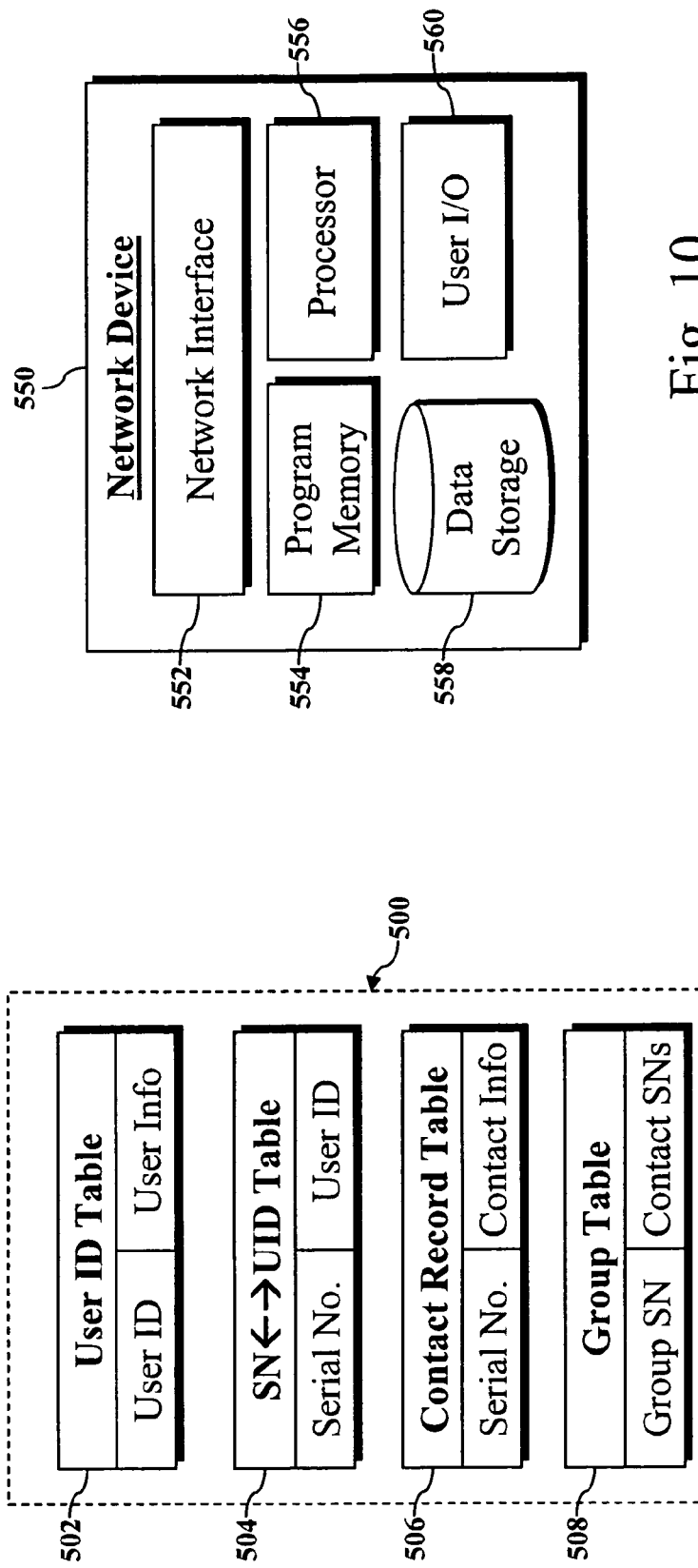

| Contact Reply | | |
|---|---|---|
| Reply Type | Serial # | Contact Record Data |

Fig. 15a

| Contact Reply Container |
|---|
| Contact Reply |
| Contact Reply |

Fig. 15b

| Internal Update | | |
|---|---|---|
| User's Serial # | Device ID | Request Type | Requested Serial # |

Fig. 16

CONTACT MANAGEMENT SYSTEM AND METHOD

FIELD OF THE INVENTION

The present invention relates generally to contact management systems, and more particularly, to systems and methods for selectively disseminating personal contact information.

BACKGROUND OF THE INVENTION

It is customary for individuals involved in personal, commercial or professional activities to exchange contact information with their associates. In a typical exchange, parties convey company names, personal names, job titles, telephone numbers, mailing addresses, e-mail addresses, web page addresses and other contact information. The mode of exchange usually includes verbally stating the information, writing down the information or exchanging business cards or stationary. Traditionally, people recorded and organized contact information manually by writing contact information into an address book or by affixing a business card or a contact entry to a record keeping system such as Rolodex®.

Today's computer-based contact management applications provide powerful search and retrieval capabilities and user friendly application interfaces, which make it convenient for individuals to enter contact information into their personal computers. Contact management applications are also found on portable devices including cellular telephones, hand-held computers, VoIP (Voice over Internet Protocol) telephones, and web-based applications. Additionally, many businesses employ enterprise resource planning systems, customer relationship management systems, sales force automation systems and other systems having contact management functionality. As a result, a large number of contact management applications are available for personal and business use, and individuals regularly utilize more than one contact management application to store and maintain their contact information.

Entering contact information into multiple contact management applications requires a time-consuming and redundant manual data entry process. The high costs associated with manual data entry are well-understood, and many prior art systems have been designed to address these concerns. For example, creating an electronic backup file of a contact information database enables contact data to be automatically restored to a contact management application if the application's database becomes corrupt. Backup files also enable data from one application to be imported into another application, provided the file formats are compatible or translation from one format to another is feasible.

Some prior art systems were designed to minimize the burden of manually entering contact information through use of specialized hardware and software. In one approach, a business card scanner is used to scan the characters on a printed business card, and specialized Optical Character Recognition (OCR) software attempts to identify the scanned characters and assign the identified characters to appropriate data fields in a contact management application. These systems require the purchase of expensive hardware and software, and human oversight is needed to ensure accuracy of the recognized characters and placement of the data in the appropriate contact information field (e.g., the software may mistakenly assign a fax phone number to a voice phone number field). These scanning systems are typically adapted to work with personal computers and may not be compatible with small computing devices such as personal digital assistants (PDAs), handheld computers, and cellular telephones. These scanning systems are further limited to scanning printed business cards, thus contact information received through other conveyances (e.g., verbal or handwritten) will still require manual data entry.

In another approach, a Uniform Resource Locator ("URL") for an HTML webpage is encoded into barcode format onto a business card. A recipient of the business card scans the barcode into a web browser application to access a corresponding webpage containing personal contact information. This type of system is described in Software Patent Institute Serial Number TDB0901.0055, entitled "E-Business Card System," and Serial Number TDB1093.0202, entitled "Coded Business Cards." Drawbacks of this approach include high equipment costs and the inability to use the system to input data into existing contact management applications.

Small, portable devices such as PDAs, handheld computers or cellular phones present additional problems for users needing to manually enter contact information. Cellular phones, for example, include numeric keypads in which a single key is used for entry of a number and multiple letters. As a result, a user may need to press the same key three or four times to select a desired letter or number. Many pen-based PDAs do not include a physical keypad, but instead provide the user with a "virtual" keyboard on the PDA display that may be tapped with a pen. Some small computing devices include a miniaturized keyboard, but data entry remains more challenging than using a full-sized keyboard on a typical desktop or laptop computer. Because of the difficulty in entering and managing data on small devices, many users manage contact information using a software application on a desktop computer. The contact information can be entered and viewed through the desktop application and then downloaded to compatible contact management applications on PDAs, handheld computers and cellular phones, via a cable or wireless network transmission.

To facilitate the electronic exchange of contact information, the Internet Mail Consortium developed a specification for an electronic business card data structure called a "vCard." Users typically exchange vCards as attachments to email messages. The recipient of a vCard may import the vCard data into a contact management application that supports the vCard format. Drawbacks of the vCard include the difficulty of maintaining up-to-date contact information once conveyed and the lack of compatibility with traditional modes of conveyance such as a standard business card, which still requires manual input of contact information.

Web-based contact management applications have also been introduced, but these systems are not widely used due to drawbacks in the various approaches. In one approach, a subscriber enters contact information online, shares the information with other online subscribers and may download other subscribers' contact information to a proprietary application. Among the drawbacks of these systems are the use of proprietary contact management software and the requirement that both parties be subscribers to the web-based system.

Another approach offers add-on modules to contact management applications in widely adopted e-mail applications to assist in maintaining current contact information. Examples of this type of system are described in U.S. Pat. Nos. 6,694,353 and 6,701,348. In one approach, the contact management application notifies the user when the application sends an email message to a contact at an email address that is not valid. The stored contact information may then be updated using a secondary email address for the intended recipient. In another approach, a user of an email application transmits an email message to each member of the user's contact list requesting that each recipient verify the accuracy of the recipient's current contact information. One drawback with these approaches is that use is limited to certain software applications, such as Microsoft Outlook. Another drawback is that sending e-mails to recipients in a contact list may be inconvenient and annoying to the recipients. When a recipient's contact information is stored in multiple contact lists, the recipient may be inundated with email requests from the owner of each list to separately verify the recipient's stored contact information. Another drawback is that these systems require unique context dependent identifiers for use in data lookup. Context dependent identifiers include telephone numbers and email addresses. A user who lacks a required identifier cannot store and share contact information on these systems. Further, context dependent identifiers are subject to change, for example, as the user moves or changes jobs.

SUMMARY OF THE INVENTION

The present invention is a computer-implemented contact management system and method. In one aspect of the present invention, a method includes creating and storing a contact record in a contact management system, generating and storing a unique serial number corresponding to the contact record, and conveying the serial number to a recipient. The recipient may then enter the serial number into a network-enabled computer application, request (via the application) the record from the contact management system corresponding to the serial number, receive data associated with the contact record, and store the data in the application's database.

In another aspect of the present invention, a method for automatically updating contact information includes storing (by the application) a cross reference record including the serial number and the index of the record stored in the application's database, receiving updated data associated with the serial number, retrieving the record in the application's database associated to the serial number, and updating and storing the associated contact information.

In another aspect of the present invention a synchronization function enables network-enabled applications associated with the recipient to share contact information without re-entering the serial number. A request replication method for automatically entering or deleting contact information in a second network-enabled application includes logging, by the contact management system, each request for contact information from each network-enabled application, sending (by the application) a synchronization request, and receiving by the application either contact information or deletion instructions associated to the serial numbers requested by other network-enabled applications.

A more complete understanding of the present invention will be afforded to those skilled in the art, as well as a realization of additional advantages and objects thereof, by a consideration of the following detailed description. Reference will be made to the appended sheets of drawings, which will first be described briefly.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 6 illustrates an embodiment of a contact registry server;

FIG. 8 is a flow chart illustrating an embodiment of a process for sharing a group of contacts;

FIG. 9 illustrates data records stored in a contact registry database in accordance with an embodiment of the present invention;

FIG. 10 illustrates an embodiment of a network device;

FIG. 11 illustrates logical components of a contact application in accordance with an embodiment of the present invention;

FIGS. 15a-b illustrate embodiments of a contact reply message and contact reply container, respectively; and FIG. 16 is an embodiment of an internal update message.

DETAILED DESCRIPTION OF PREFERRED EMBODIMENTS

Figure 1:
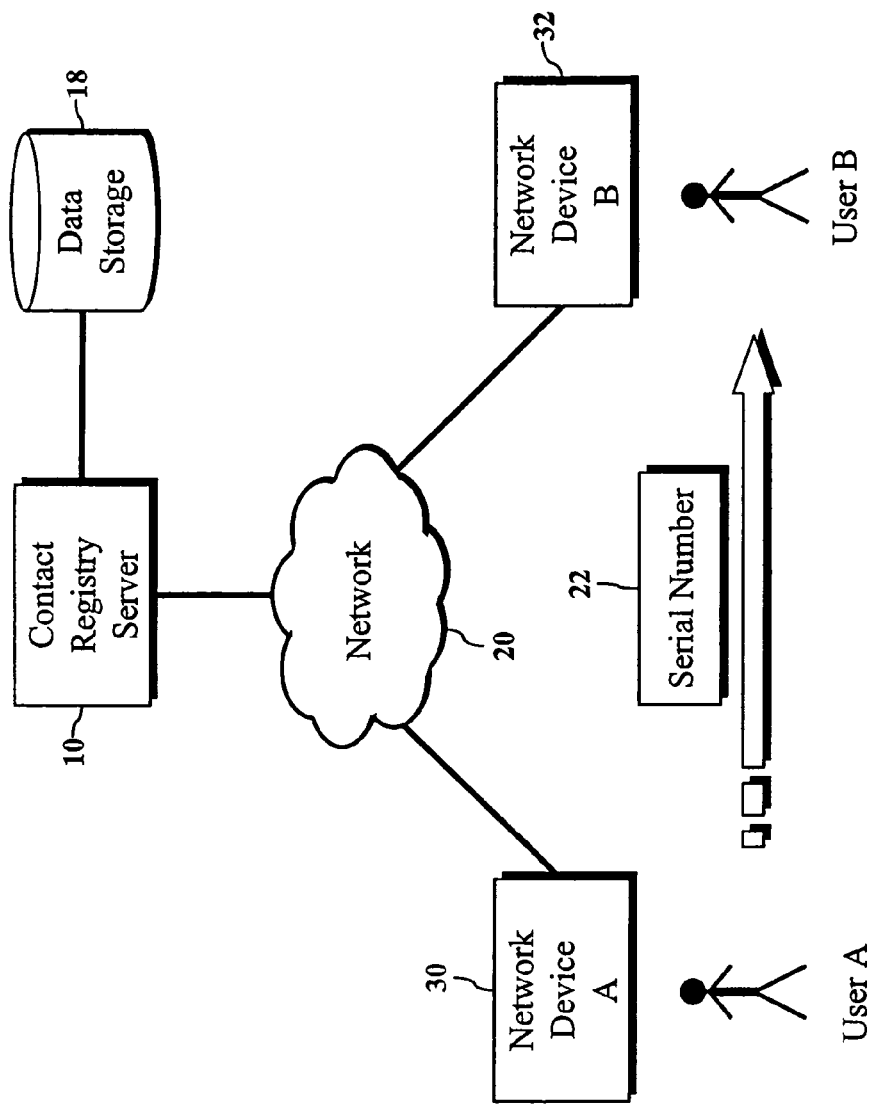
FIG. 1 illustrates an embodiment of the present invention.

An exemplary embodiment of the present invention will be described with reference to FIG. 1. A contact registry server 10 provides contact management services to a plurality of network devices, such as network devices 30 and 32, through a network 20. The contact registry server 10 includes at least one computer adapted for communication with the network 20 and a data storage 18 storing contact information. The network 20 includes any system or systems capable of facilitating communications between the contact registry server 10 and the network devices 30 and 32, and in various embodiments may include the Internet, a wireless network or an intranet. Each network device 30 and 32 is adapted for communications with the contact registry server 10 through the network 20, and may include a mobile telephone, personal digital assistant, vehicle navigation system, personal computer, portable computer, VoIP telephone or other device.

Figure 2:
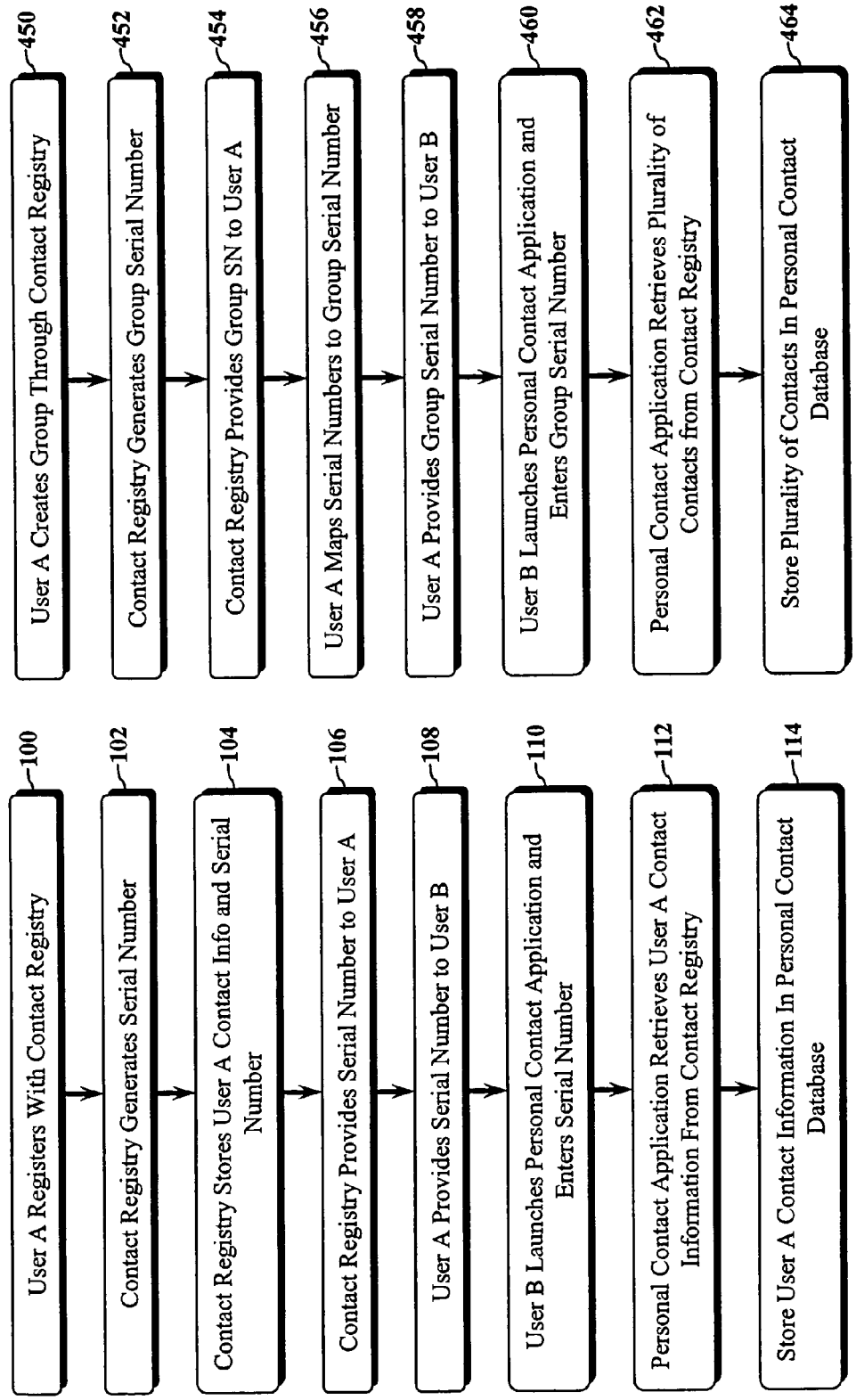
FIG. 2 illustrates an operation of the embodiment of FIG. 1.
Figure 3:
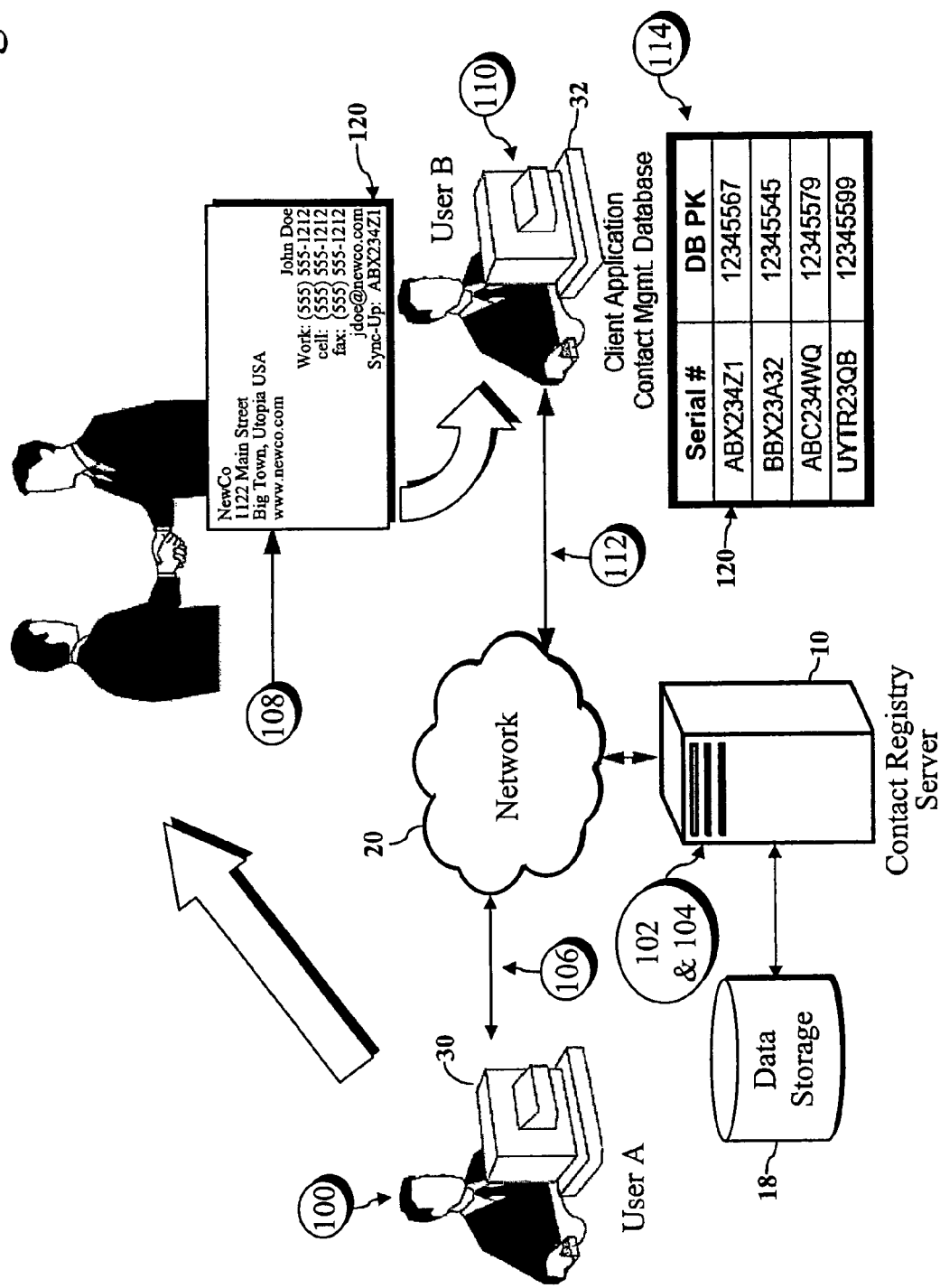
FIG. 3 illustrates another operation of the embodiment of FIG. 1.

Referring to FIGS. 2 and 3, an operation of the embodiment of FIG. 1 will be described. In step 100 a first user, User A, registers with the contact registry server 10. Registration provides User A with permission to store, maintain and disseminate contact information via the contact registry server 10. In one embodiment, User A establishes communication with the contact registry server 10 through the network device 30 by launching a web browser application and entering or selecting a URL of the contact registry server 10. Through web pages served by the contact registry server 10 to the network device 30, User A invokes a new user registration process.

User A enters a unique username and password combination for use by the contact registry server 10 to identify and authenticate User A in subsequent visits to the website. Alternatively, a temporary password is automatically generated by the contact registry server 10 and may be changed later by User A after the first login session. In one embodiment, communications between the network device 30 and the contact registry server 10 during the registration and login process are encrypted—e.g., using the Secure Socket Layer (SSL) protocol—providing a layer of protection against the unwanted access to or dissemination of personal contact information.

In step 102, the contact registry server 10 generates a unique serial number to identify User A's personal contact information. The serial number may be any unique identifier that is amenable for user input into a network device. In the exemplary embodiment, the contact registry server 10 randomly generates a 9-digit serial number, including a concise 8-digit alphanumeric string and a 1-digit alphanumeric checksum, and queries the data storage 18 to ensure that the generated serial number is unique—i.e., is not already in use by the contact registry server 10 to identify personal contact information. Alternatively the 8-digit serial number may be selected by the user, User A, and the contact registry server 10 generates an associated 9-digit serial number.

Alphanumeric characters enable the contact registry server 10 to issue serial numbers with an extensive address space that can accommodate millions of users. For example, over 2.8 trillion serial numbers can be generated using only 8 digits of case-insensitive alphanumeric characters—where each character has 36 possible values (e.g., 0 through 9 and A through Z). Alternatively, the serial number may include characters from other character sets to accommodate different languages and cultures, including non-western character sets such as Kanji. In one embodiment, an extended character set known as the Unicode character set is used.

When User B enters a 9-digit serial number, the network device 32 can detect certain data entry errors by verifying the accuracy of the checksum digit and notify User B when an invalid serial number is detected. The checksum may be generated using conventional error detection algorithms such as CRC-8. User B can rely on the accuracy of the information entered by User A into the contact registry server 10, which presumably has been verified by User A.

After a unique serial number is generated, a filtering function is applied by the contact registry server (CRS) to determine whether the serial number is valid based on stored criteria. For example, in one embodiment the data storage 18 includes a table of offensive words, phrases and character patterns that are utilized by the filtering function to determine whether the serial number includes a word or pattern of characters that may be deemed offensive. If the serial number is not valid, then a new serial number will be selected.

In step 104, a data record is created in the contact management database of data storage 18 for User A, and the unique serial number is stored therein. The record includes a field for the serial number, and other fields that are common in contact management databases such as name, address, telephone number and email address. In one embodiment, User A is provided an opportunity to populate the database record with personal contact information through a web-browser interface. The contact registry server 10 may also store additional information, such as user account information and user preferences. In step 106, the contact registry server 10 communicates the serial number to User A via the web browser interface on the network device 30 or, alternatively, via another method of conveyance such as an email message to User A.

In step 108, User A conveys the serial number 22 to User B. User A may print the serial number 22 on a business card and provide the business card to User B, type the serial number into an email message and send it to User B, verbally convey the serial number to User B or provide the serial number 22 through another mode of conveyance. In one embodiment, the serial number is conveyed along with an associated trademark that identifies the source of the serial number 22 and the associated contact registry server 10. For example, User A may convey the serial number 22 in the form "Sync-up: ABX225Z2C," where "Sync-up" is a promoted trademark identifying the source of the number, making it clear what the number conveys. In other words, in this embodiment the number isn't just a serial number printed on a business card, displayed in an email or conveyed verbally. It is conveyed in association with a trademark to distinguish it from other serial numbers and addresses such as email addresses, phone numbers, etc.

In step 110, User B enters the serial number into a contact management application on network device 32. In one embodiment, User B launches the personal contact management application on the network device 32 and creates a new contact record which includes a blank serial number input field identified by a common name or trademark. The personal contact management application is adapted to transmit an entered serial number to the contact registry server 10 and request corresponding contact information associated with User A.

To protect against the unwanted dissemination of User A's unique serial number and contact information the data is encrypted before it is stored in the data storage 18. In one embodiment, the contact information is encrypted with a common encryption algorithm using User A's User ID as the public key and User A's confidential password as the private key.

In one embodiment, another security measure implemented by the contact registry server 10 includes detecting random serial number requests and invalid serial number requests, and denying access to users and/or network devices who attempt to access personal contact information without authorization from the user associated with the contact information. For example, a registered user of the contact registry server 10 may be denied access to the system after numerous failed attempts to enter a serial number. Invalid serial numbers may be detected, for example, if the entered serial number includes too many or too few digits, if the serial number has not yet been assigned to a user, or if the checksum is invalid.

Figure 4:
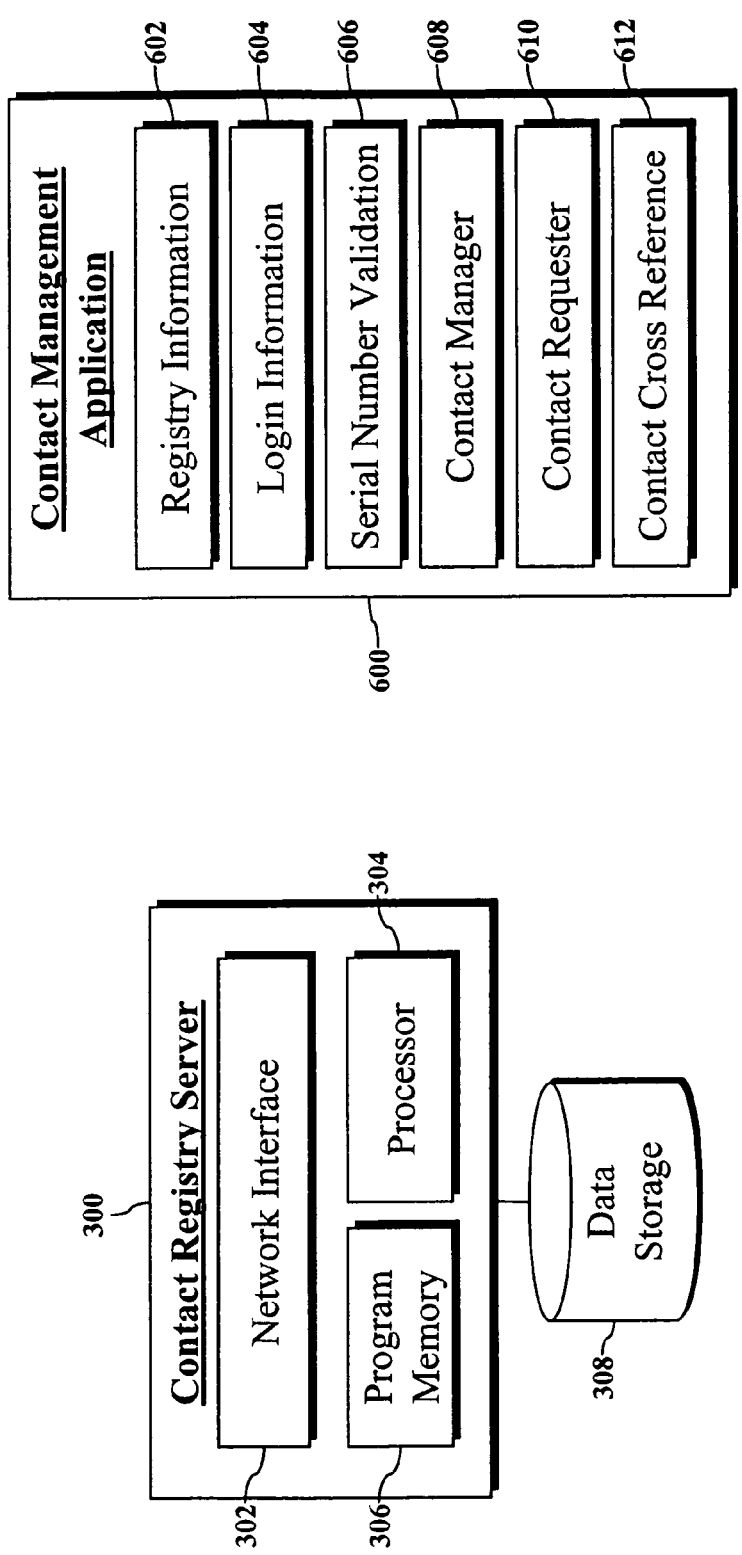
FIG. 4 illustrates an embodiment of a data structure for a contact request.

A message format for requesting contact information from the contact registry server 10 is illustrated in FIG. 4. The contact request is transmitted from the network device 32 to the contact registry server 10 and includes a User ID for authentication of the requestor, a Device ID for logging and synchronization of stored contact information, a device type for identifying a data format or protocol associated with the network device 32, a request type indicating if the message is a request for a new record, an update, or a deletion (among other possible request types) and the requested serial number. In one embodiment, the contact request also includes a contact serial number of the requestor in order to associate the requested serial number with a particular contact serial number used by the requestor. In an alternate embodiment, User B may download User A's contact information via a web interface provided by the contact registry server 10 in a common data format such as XML, comma-delimited, and vCard.

In one embodiment, the contact request and reply further includes a 4-digit or 5-digit identifier providing space in the request and reply for a 2-digit or 3-digit language abbreviation and a 2-digit country abbreviation. The 2-digit country code may be specified in accordance with International Standards Organization (ISO) ISO 3166-1 (e.g., US, UK, JP, etc.), and the language may also be specified in two digits in accordance with ISO 639-1 or three digits in accordance with ISO 639-2 (e.g., DUT: Dutch; ENG: English; FRA: French; JPN: Japanese.) Alternatively, the contact request and reply further includes a character encoding in accordance with ISO 8859, UTF-8, UTF-16, ISO 2022, and others. For example, a request from an Russian speaking user of a contact management application who resides in the United States may include the term "RUUS" (Russian+U.S.) or ISO 8859-5 (Cyrillic). In this manner, a subscriber doing business in different countries, across different languages, can convey serial numbers encoded in language character sets other than the Roman Alphabet and the contact registry server 10 can correctly interpret the serial number. Additionally, the contact record may similarly be encoded in difference languages.

In one embodiment, a contact record is stored in a first language, such as English, and the contact registry server receives a request identifying the contact record, the request including a code for a second language code, such as Japanese. In this embodiment, the contact registry server is adapted to translate the stored contact record from the first language to the second language and return the contact record in a format associated with the second language code.

In alternate embodiments, access to User A's contact information requires approval by User A. While the contact registry server 10 awaits approval from User A, the contact registry server may respond with an "approval pending" message to User B.

After access to User A's contact information is granted to User B, in step 112, the contact registry server 10 retrieves User A's contact information—identified via the received serial number—from the data storage 18. The contact registry server 10 transmits the contact data (e.g., first name, middle name, last name, telephone number, e-mail address, etc.) in a structured information record, such as an XML file, suitable for mapping to data fields in User B's contact database. The format may be specified by User B's contact management application through a code in the contact request (e.g., in the device type field).

Figure 5:
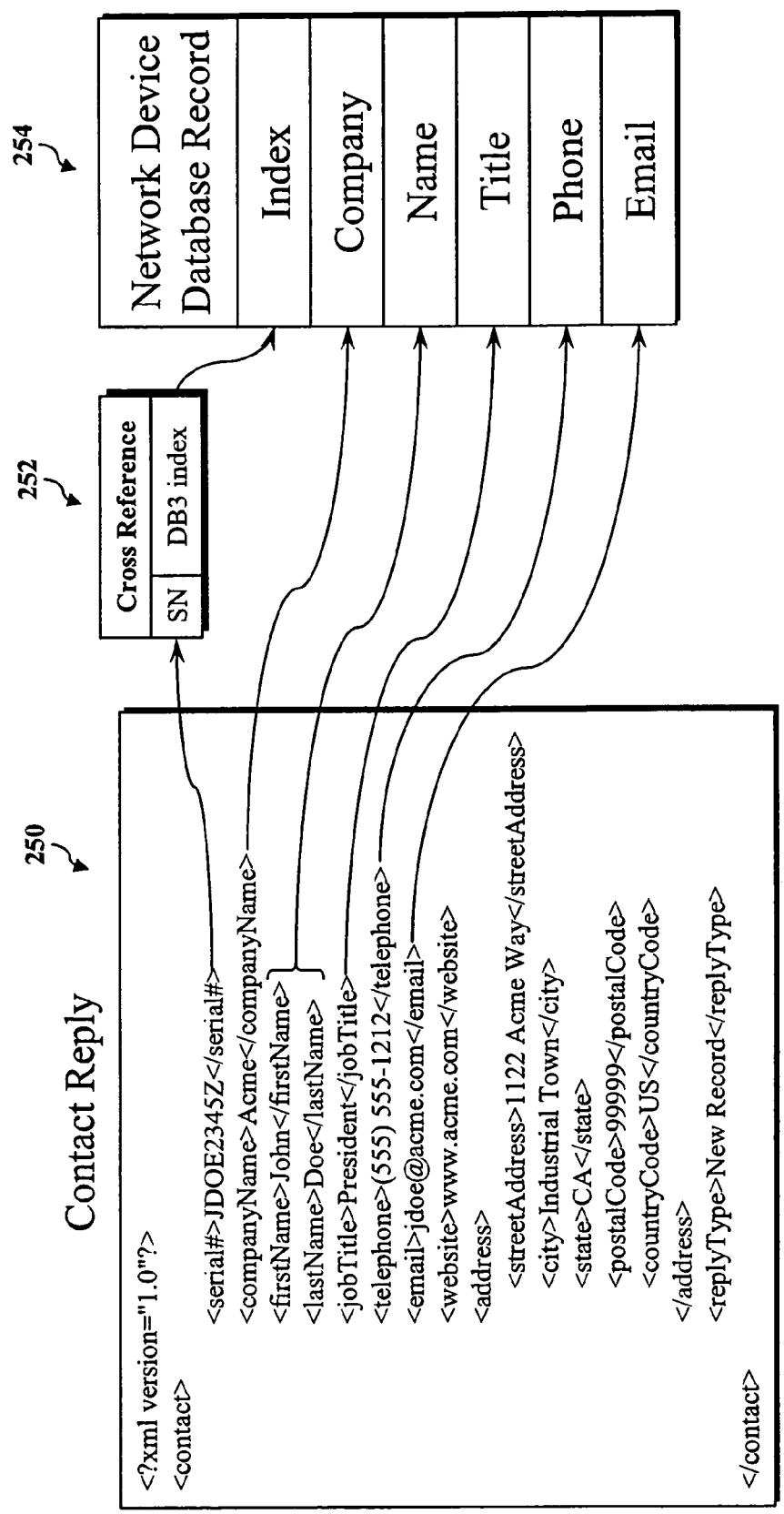
FIG. 5 is an embodiment of a contact reply message and an associated network device database record.
Figure 7:
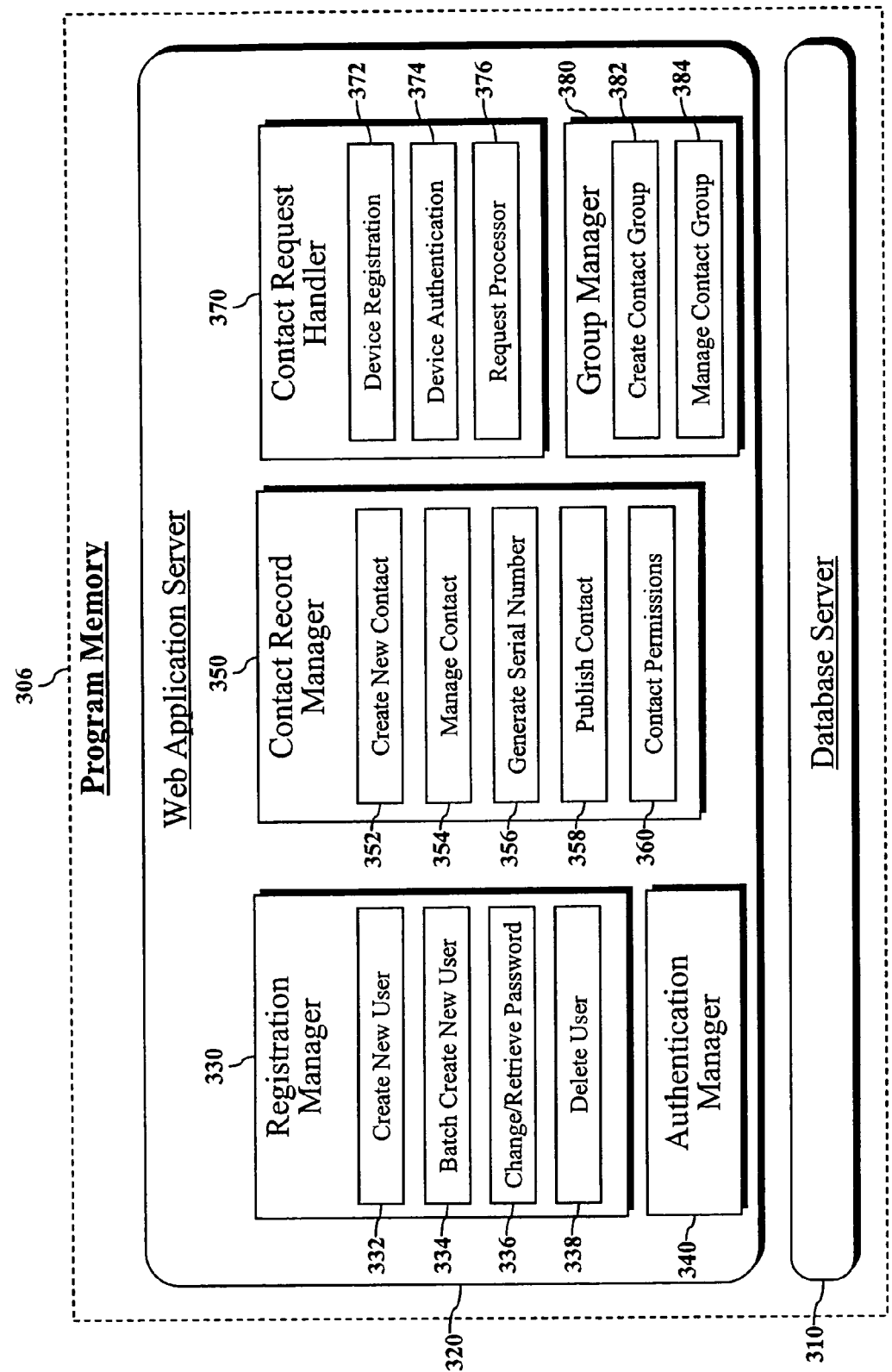
FIG. 7 illustrates logical components of the contact registry server of FIG. 6.

The received contact information is imported into User B's personal contact database in step 114. As illustrated, the conveyed serial number 120 is stored in a database table that, at least, includes an identifier of an associated contact record, such as a unique database record index or primary key. An example of a mapping from an XML formatted contact reply message 250 to a network device database record 252 and cross-reference file 254 is illustrated in FIG. 5. In one embodiment, the received contact data is entered as a new record and the serial number is stored in a cross-reference file along with the record ID or index of the new record within the contact management application. The cross-reference file facilitates a link between the contact data stored on each network device and the corresponding data stored in the contact registry server, which is useful for updates, synchronization (i.e., the delete requests) and other linked requests.

Advantages of the present embodiment will be readily understood by persons having ordinary skill in the art. For example, in the present embodiment a contact record is stored in a centralized database, and includes a unique, context-free serial number. A concise context-independent serial number (e.g., not an e-mail address associated with an email account or a telephone number associated with a residence, etc.) is useful for conveyance, contact information requests and creating a cross-reference between the contact record stored in the data storage 18 and a database index of the network device 32's contact management application.

Unlike a context-driven ID such as an e-mail address or telephone number, a user does not typically need to change the context-independent serial number over time, avoiding a break in cross-reference links that often occur (e.g., when a person changes jobs). In this manner, the context-independent serial number is associated with a trademark making it more easily conveyed. Using alphanumeric characters for the serial number makes it possible to issue short serial numbers amenable to user input that identify an extensive address space. By contrast, a conventional contact record has over 100 characters, each of which requires entry under a manual input system. The present embodiment also makes it possible to synchronize many different types of devices and applications, allowing a user to maintain consistent, up-to-date contact information across many different devices.

In one embodiment, the contact registry server 10 is adapted to automatically synchronize a plurality of personal contact databases associated with a user. The contact registry server 10 logs each request for contact information from each network-enabled application. When one of the network-enabled applications sends a synchronization request to the contact management system the application will automatically receive contact information, deletion instructions or other information requested by other network-enabled applications associated with that user.

Contact Registry Server

An embodiment of a contact registry server 300 will now be described with reference to FIGS. 6-9. The contact registry server 300 includes a network interface 302 to facilitate communications with network devices, a processor 304 and a program memory 306 that includes logic for instructing the processor 304 to facilitate the creation, storage, maintenance and retrieval of contact information in a data storage 308.

The program memory 306 of the exemplary embodiment includes a database server 310 and a web application server 320. The web application server 320 includes a registration manager 330 for handling user registration, an authentication manager 340 for authenticating users and devices accessing the contact registry server 300, a contact record manager 350 for handling the creation, storage and updating of contact information, a contact request handler 370 for delivering contact information to requesting network devices, and a group manager 380 for handling group creation and management.

The registration manager 330 includes processes for creating a new user 332, creating a plurality of new users through a batch process 334, changing/retrieving a password 336 and deleting users 338. In one embodiment, these processes may be invoked by a user of a network device through a webpage interface or via the interface of a contact management application.

In another embodiment, the "new user" batch process 334 invokes the contact record manager 350 to create a plurality of contact records simultaneously. The batch process includes receiving at the contact registry server 300 a batch of input data consisting of contact information for a plurality of users. The batch process creates new users and generates batch output data including the user ID, the temporary password, and the serial number, as well as information from the batch of input data (e.g., an e-mail address or a mailing address) that will assist in disseminating registration data to the newly registered users. The contact record manager 350 generates the serial number for each contact record and creates a new record to link the user ID and the contact record's serial number. Invalid batch data can be logged and returned to the requestor in a report. It will be appreciated by those having ordinary skill in the art that the batch input and output data could come from a file, a database, a network or other source.

The delete users process 338 includes both single delete and batch delete capabilities. In one embodiment, a large entity such as a mobile telephone provider or Internet service provider (ISP) offers access to the contact registry server as a value-added service bundled with other offerings. The batch delete would be used by large entities when access to the systems changes on a regular basis and may be part of standard integration of the contact registry service to the large entity.

The contact record manager 350 includes program logic for creating a new contact 352, managing contacts 354, generating serial numbers 356, publishing contacts 358, and managing contact permissions 360. In one embodiment, the logic for generating serial numbers 356 includes a pattern recognition algorithm to filter out serial numbers including offensive or otherwise undesirable sequences of digits. The user provides contact information through the contact record manager 350 which stores the contact information in the data storage. Personal contact information may be input and updated through a webpage interface. The contact request handler 370 includes device registration 372, device authentication 374 and request processor 376 functions.

Once a user completes the registration process and changes the assigned temporary password, the contact record may be published, which makes it possible for network devices to request the contact record. Next, the user may set contact permissions for the contact record, which makes it possible for the user to deliberately authorize or refuse each request for the contact record, or to automatically approve or reject requests.

The contact permissions process 360 restricts access of third party users and network devices to particular contact records. When a contact record is published the contact information is available for retrieval by any user who enters the corresponding serial number. Through the permissions feature, a user may manually approve each request for the user's contact information, automatically approve each request, or establish rule-based conditions for approving access to the contact data. For example, the user can deny the provision of contact information to anonymous requesters. Referring back to FIG. 1, when User B requests User A's contact record, the system can generate a response to User A indicating that it is awaiting approval from User A to release the requested information to User B. This would spawn follow-up requests for the record (if approved), a refusal message (if the request is rejected), or a "still waiting" message.

In one embodiment a plurality of users, such as company employees, may be grouped under a single serial number. A group serial number is assigned by the contact registry server 300 and mapped to a plurality of existing serial numbers in a group database 508 (see FIG. 9). Further, a network device requesting contact information associated with a group serial number will receive a plurality of associated contact records in response. The group manager 380 includes program logic for creating a contact group 382 and managing contact group 384. In one embodiment, the generate serial number function 356 is adapted to generate a serial number for the group, and the request processor 376 is adapted to process group requests and replies.

Referring to FIGS. 1 and 8, an embodiment of the operation of group serial numbers will be described. User A establishes a contact group through an interface on the contact registry server 10 in step 450. The contact registry server generates a unique group serial number in step 452 and transmits the group serial number to User A in step 454. In step 456, through a second interface on the contact registry server 10 User A enters one or more serial numbers of potential group members. The group members may be referenced by individual contact serial numbers and group serial numbers which are mapped to the group serial number managed by User A. In one embodiment, the contact registry server 10 requests approval to include individual contact or group serial numbers in the group, as required. In step 458, User A conveys the group serial number to a third party, such as User B, to disseminate contact information for the group of users.

In step 460, User B launches a personal contact management application and enters the group serial number. In step 462, the personal contact management application retrieves individual contact information associated with the entered group serial number from the contact registry server 10. The contact registry server 10 receives the group serial number from the personal contact management application and retrieves the corresponding contact records from the database. The group of individual contact records are transmitted to the personal contact management application, such as through a contact reply container (see FIG. 15b). It will be appreciated by those having ordinary skill in the art that the plurality of contact records (each of which may include more than 100 characters) associated with the group may be retrieved by entering a concise serial number saving a significant amount of time and effort. In step 464, each of the received contact records is stored in the personal contact database. In one embodiment, the personal contact management application maintains a mapping of each contact record to its individual serial number, and each individual serial number to the group serial number.

A high level data structure for storing contact information is illustrated in FIG. 9. The data structure 500 includes a User ID Table 502 storing information for registered users, including a User ID and user information. In one embodiment, user information includes an account password and billing information, and may include additional data used by the contact registry server 10. A second table 504 maps serial numbers to user IDs allowing the system to track the user associated with each contact record, and allow a single user to maintain contact information under multiple serial numbers. For example, it will be appreciated by those having ordinary skill in the art that a single user may have a plurality of contact records to accommodate multiple languages (e.g., English, French or Japanese), countries and uses (e.g., business and personal). A contact record table 506 stores user contact information and an associated serial number. User contact information may include name, title, address, telephone numbers, email address, company name, website, and other information.

Network Device

An exemplary network device 550 is illustrated in FIG. 10. The network device 550 may be any device adapted to communicate with the contact registry server 300, such as a personal computer, a personal digital assistant (PDA), a wireless phone, a VoIP phone, or a network enabled device. The network device 550 includes a network interface 552 providing access to the contact registry server 300 through the network, a program memory 554 and processor 556 for controlling the network device 550, a data storage 558 and a user input/output mechanism 560, such as a display and keyboard.

Referring to FIG. 11, the program memory 554 includes a contact management application 600 which includes, or is enhanced with, registry information 602 and login information 604, which enable the contact management application 600 to access the contact registry server 300. A serial number validation function 606 checks the validity of a serial number format entered by a user. In the exemplary embodiment, the serial number validation function 606 verifies that the serial number entered by the user is an 9-digit alphanumeric string and that the checksum digit is accurate. A contact manager function 608 provides an interface allowing a user to add, edit, delete and view a plurality of contacts. A contact requester function 610 enables a user to request contact records from the contact registry server 300. The contact requester 610 retrieves the network address of the contact registry server 300 from the registry information 602, generates a request message and transmits the message to the contact registry server 10 via the network device's network interface 552, the network 20, and the contact registry server's 300 network interface 302. A contact cross reference function 612 maintains a cross reference table mapping the serial numbers of retrieved contact records to the contacts stored by the network device.

In an alternate embodiment, the program memory 554 includes one or more network-enabled applications. For example, a graphics design application, such as Adobe Illustrator or Adobe InDesign, may include enhancements in the form of a plug-in allowing the application to receive a serial number, contact the contact registry server 10, and retrieve associated contact information. Through a graphics design application, the user may create a graphic that includes graphic variables. Entering the serial number into the menu for the application plug-in will cause the graphic variables to be set in accordance with the current associated contact information. An employer could use this feature to manage and print business cards, or a print shop might operate as a retail point of sale for the service. When the user updates data, the graphic will update automatically. In another example, a serial number may be embedded into a PDF, allowing the PDF to be updated as corresponding contact information changes.

In another embodiment, the serial numbers of the exemplary embodiment may also be used to aid the completion of online forms. For example, User A may register with a plurality of websites. Each website having its own registration screen seeking personal information from User A. Affiliated websites may include a serial number input field allowing User A to complete the contact information aspects of the form merely by entering his serial number. The website benefits by ensuring it maintains current customer data, and enticing new users due to the simplified registration process. In some applications, the serial number may be used for user authentication allowing the user to protect his email address (and limit spam) and reduce the risk of providing credit card information over the Internet (e.g., id theft). Further, the contact registry server tracks who has access to the contact registry information, allowing the user to track websites to which the user is a member and allows the commercial websites to maintain current contact information for the user.

In another embodiment, the contact information includes substantive content for use by a network-enabled application. For example, a contact record may include a graphic or logo, or specify a certain font style, associated with the contact information that will control the look and feel of material printed through the network-enabled application.

In another embodiment, the contact registry server is provided as an add-on service to the services offered by cellular networks or internet service providers for a nominal fee per subscriber. Another way to generate revenue is to have users pay for information retrieval.

Synchronization & Updates

Figure 12:
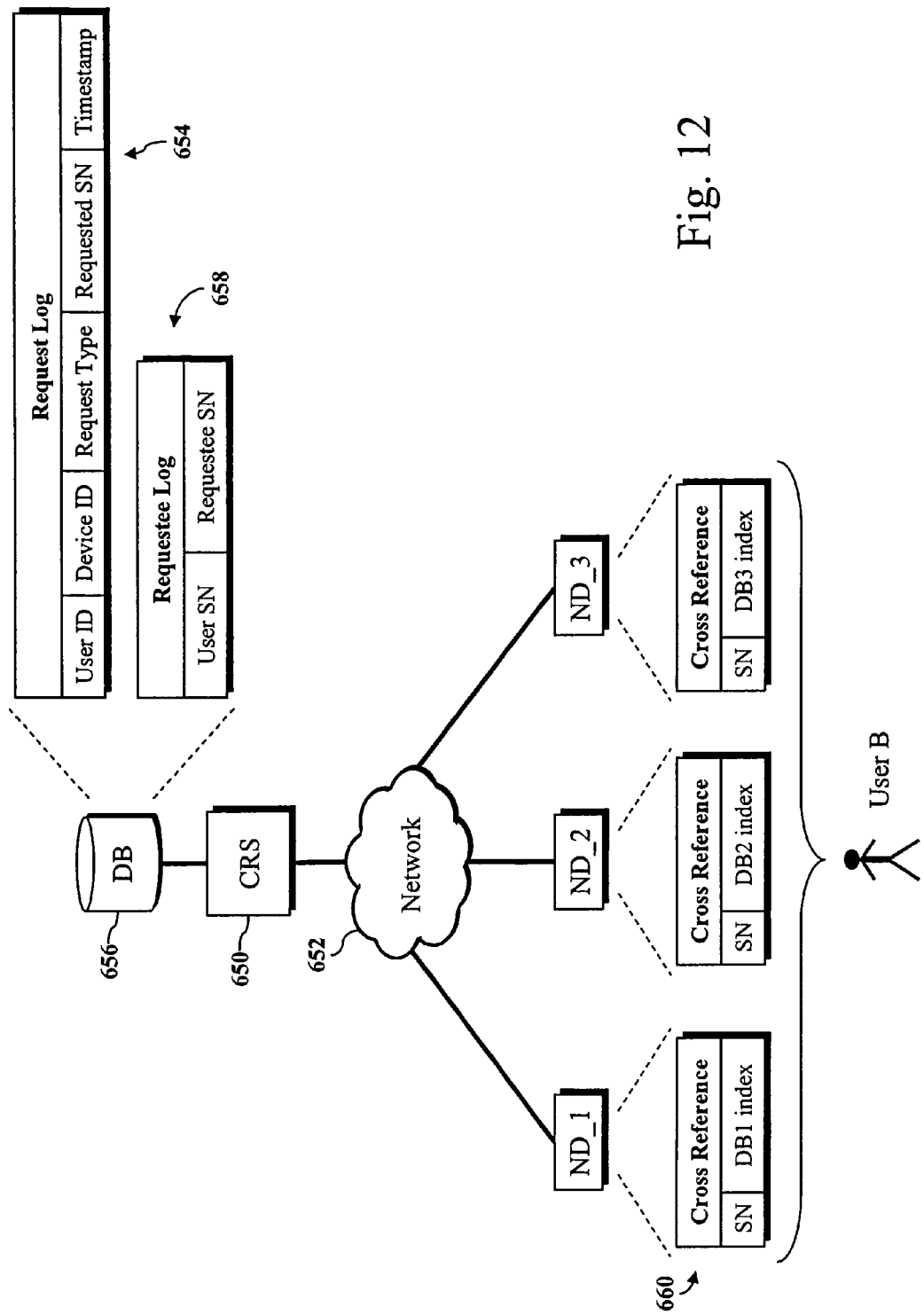
FIG. 12 illustrates an operation of a synchronization process in accordance with an embodiment of the present invention.

Referring to FIG. 12, in one embodiment User B operates a plurality of network devices ND_1, ND_2 and ND_3, such as a personal computer, mobile phone and PDA device. In operation, User B enters a serial number in a first network device ND_1, which transmits a contact request message to a contact registry server (CRS) 650 through a network 652. The CRS 650 returns a contact reply to ND_1 including the requested contact information. The CRS 650 also creates an entry in a request log 654 in the database (DB) 656 logging the time the contact request from ND_1 was processed. ND_1 receives the requested contact information from the CRS 650 and stores the received contact information locally in a memory or other data storage associated with the ND_1.

The request log 654 tracks contact information requests and includes a user ID, a device ID, a request type, the requested serial number, and a timestamp for the request. The user ID uniquely identifies the requesting user and may include one of the user's personal serial numbers assigned by the CRS 650, a login name or other identifier. The device ID uniquely identifies the requesting network device, and in one embodiment a unique identifier is provided in each copy of the network device software before it is deployed on a network device. The CRS 650 may associate a request log with one of the requesting user's contacts when the request log includes the serial number for the requesting user's contact. In this manner, a user with more than one serial number, for example, a work serial number and a personal serial number, may manage the synchronization of separate contact lists. In another approach, the network device software requests a unique identifier from the CRS 650. Alternatively, the MAC address associated with the network device hardware may be used. Identifying each device facilitates the synchronization of contact records across multiple devices. For example, if a person requests a contact record with one device, another network device can request the same record without additional user effort.

The request type includes a code identifying whether the received request is for new contact information, an update to existing contact information, a request to delete contact information associated with User B or other type of request. When User B requests User A's serial number, the contact information is received and may be inserted as a new record into User B's contact management database. User B may later re-request User A's serial number, in which case the contact information is received, the corresponding contact record is located and the stored contact information is updated with any changes. User B may also issue a request to delete User A's contact information, which causes the contact information record to be deleted from the contact management database. Each of these requests corresponds to common database functions that may be implemented in this manner.

Initially, the requested contact information (stored on ND_1) is not stored on network devices ND_2 and ND_3. User B may separately enter the serial number into the contact management applications of ND_2 and ND_3 to retrieve the contact information from the CSR 650. In one embodiment, the network devices ND_1, ND_2 and ND_3 include a synchronization process that is automatically invoked when the respective network device contacts the CRS 650 with a contact request. The network devices may also be configured to periodically (e.g., daily, weekly, monthly, etc.) invoke the synchronization process to regularly check for updates. Further, it is contemplated that a user may manually invoke the synchronization process through the contact management application when desired.

The request log 654 enables User B to initiate a synchronization request to the contact registry server 650 from a network device to download new contact information, remove deleted contact information and update modified contact information. In this manner, User B is not required to reenter contact serial numbers into each device. In one embodiment, the log's timestamp is used to limit synchronization to records that have been added, updated or deleted since the device's last synchronization request. The network device may be identified through a device ID and the request log stores the timestamp of the last synchronization for each device ID.

Figure 14:
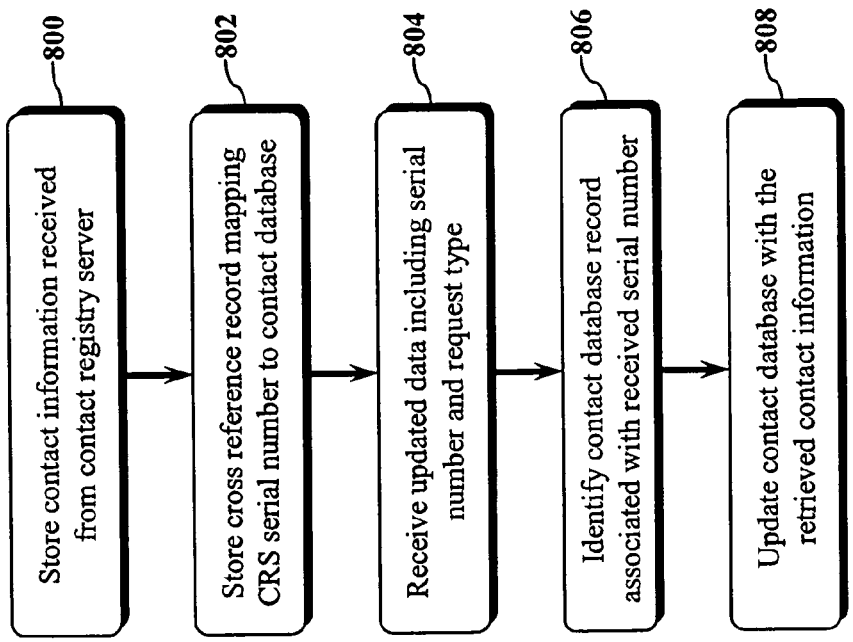
FIG. 14 is a flow chart illustrating an embodiment of a synchronization process executed by a network device.
Figure 13:
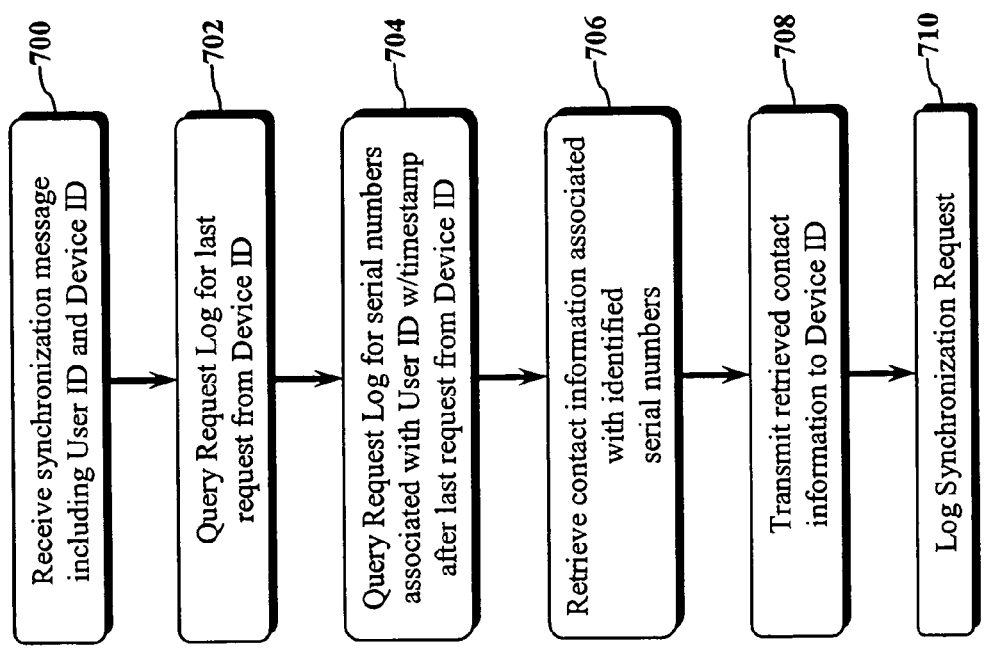
FIG. 13 is a flow chart illustrating an embodiment of a synchronization process executed by a contact registry server.

Referring to FIGS. 13 & 14, the synchronization process will be described. When the synchronization process is invoked, a synchronization request message, including the user ID and device ID, is transmitted from the ND_2 to the CRS 650. In one embodiment, the request message also includes a serial number associated to a contact of the requesting user. The CRS 650 receives the request in step 700 and queries the Request Log 654 to find the last time that ND_2 contacted the CRS 650 in step 702. In step 704, the CRS 650 retrieves all the request types and serial numbers from the request log entries associated with requests by User B subsequent to ND_2's last communication with the CRS 650, which may be measured by a timestamp field in each entry or some other serial field. In step 706, the CRS 650 retrieves the contact information for each serial number (not needed for request type "delete") and generates contact reply messages to transmit the contact information to ND_2 in step 708. In this case, since User B entered User A's serial number in ND_1, there is a request log entry for User A's serial number. When ND_2 transmits a synchronization request, it receives User A's serial number and contact information from the CSR 650 in the reply. Finally in step 710, the synchronization request from ND_2 is added to the Request Log 654, along with a current timestamp.

The network device ND_2 updates the contact information stored on ND_2 in accordance with the received request type. In the exemplary embodiment, a serial number/database record cross-reference table facilitates the update of contact records. An embodiment of an update process with a cross-reference table will now be described with reference to FIG. 14. When User B enters a serial number into the contact management application of a network device, a request is transmitted to the CRS 650 which returns associated contact information. A new contact record is created in the local contact information database and the received contact information is stored (step 800). When a new contact record is created, the contact management application assigns a local record identifier (or database index) which is stored as part of the record. In step 802, an entry in a cross-reference database 660 is added mapping the local record identifier to the serial number associated with the contact information.

The cross reference table allows the contact management application to update contact records with information stored at the CRS 650. For example, a single contact record stored on ND_1 can be updated by querying the cross-reference table for the associated local record identifier, identifying the associated contact serial number and specifying the contact serial number in an update request transmitted to the CRS 650. In step 804, contact information is received from the CRS 650, and the contact serial number is used to retrieve the local record identifier from the cross-reference table in step 806. Next, in step 808 the contact record associated with that local record identifier is requested from the contact management application. The contact record stored on the network device may then be updated with new information (or deleted as required).

The contact records are updated according to the received "request type" associated with the contact information. Request types include "new record," "update" and "delete" (among other possible request types). When a network device ND_3 synchronizes its contact information with the CRS 650, a "delete" request from ND_1 will be invoked and during synchronization the contact reply to ND_3 will have a "reply type" of "delete" and the associated serial number. The contact record associated with the received serial number is then deleted from the contact information database and the cross-reference database.

In one embodiment, when records are added and then subsequently deleted before synchronization can take place, program logic at the contact registry server does not include the records in the replies to avoid unnecessary work by the network device. In another embodiment, the contact registry server further includes an approval log so that synchronization requests do not require User B to approve subsequent requests for every single network device that User A uses. For example, if User A has the serial number of User B, User B may have the option to disallow subsequent requests or updates from User A by removing User A from the Requestee log until User B approves the request subsequently.

An exemplary contact reply data structure is illustrated in FIGS. 15*a*-*b*. A contact reply message includes a reply type, serial number and contact information fields. A plurality of updates may occur between sessions and the reply message may have more than one contact reply. To accommodate multiple contacts in a reply message, a contact reply container includes at least one contact reply message and facilitates the transmission of reply messages as a batch. A single contact reply container may include reply messages having different types, such as a contact record or a message to the user (e.g, "awaiting approval").

In one embodiment, when sending a reply message to the network device, the message is encrypted in a common encryption protocol such as MD-5 using the user's User ID as a public key and password as a private key. Using encryption for messaging and storage makes it more difficult for unauthorized users of the contact registry server to gain access to information by eavesdropping, "sniffing" or "spoofing" packet-switched network connections.

Referring back to FIG. 12, in one embodiment a requestee log 658 is used to track and control access to user records. When User B requests User A's contact information, for example, a new record is added to the requestee log 658 that indicates that User B has User A's contact information. As illustrated, the "user's serial number" is the serial number for User A and serves as a primary key in the database, and the "requestee serial number" is the serial number for User B. When User A makes a change to his or her contact record, the contact manager sends an internal update to each user linked to User A through the requestee log. The internal updates may be maintained in a database table such as that illustrated in FIG. 16. Where an internal update table is used, records are retrieved as part of the user's synchronization and converted to an entry in the request log to be downloaded the next time User B accesses the CRS 650.

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. In a network including an information management system and a plurality of network devices, a computer-implemented information management method, comprising:

receiving, at the information management system, user information from a first network device;

creating a first user account associated with a first user information record containing first user information, the first user account storing first user authentication criteria;

creating the first user information record in the information management system from the received user information, and associating the first user information record with the first user account;

generating a unique serial number for the first user information record, said unique serial number not containing network address information identifying a network address of the information management system or of the first user information record, wherein the unique serial number is generated by at least one of receiving a serial number candidate from the first network device and verifying the serial number candidate is unique, and the information management system selecting the unique serial number;

storing the serial number and associated user information in the first user information record;

transmitting the serial number;

creating a second user account, the second user account storing second user authentication criteria;

receiving, at the information management system, a request from a first requester application the request including second user authentication criteria and second user identification information associated with a second user account, at least one request type, and a requester application identifier of the first requester application;

authenticating the second user request as a request from the second user using the second user authentication criteria and the second user identification information;

generating and storing a request log associated with the second user account on the information management system, the request log including a time of the second user request, the requester application identifier of the first requester application and the at least one request type included in the request, wherein the request type includes one of a second user adding, updating, deleting and synchronizing request, and where the request type is one of add, the request log storing at least one serial number associated to the add request, and where the request type is one of delete, the request log storing at least one serial number associated to the delete request;

where the second user request contains a request type of add, processing the request by identifying at least one serial number associated to the request type, retrieving the user information record associated to the at least one serial number, determining access permissions to each retrieved user information record, and maintaining in at least one of the program memory and the data storage each user information record where access is permitted until a reply is transmitted, where the second user request contains a request type of update, processing the request by retrieving the requester application identifier of the first requester application, determining the last time the first requester application sent an update request to the information management system and retrieving each user information record requested by the first requester application with a last updated date occurring after the last time the first requester application sent an update request to the information management system, determining access permissions to each retrieved user information record, and maintaining in at least one of the program memory and the data storage each retrieved user information record where access is permitted until a reply is transmitted, where the second user request contains a request type of synchronize, processing the request by identifying each user information request made by at least one requester application of the second user other than the first requester application since a last time the first requester application sent a synchronization request to the information management system, retrieving at least one of the user information record identified by each information request and an instruction to add or delete a user information record for each user information request, determining access permissions to each retrieved user information record, and maintaining in at least one of the program memory and the data storage at least one of each retrieved user information record where access is permitted and each instruction until a reply is transmitted, retrieving from at least one of the program memory and the data storage each retrieved user information record and each instruction, and transmitting to the first requester application each user information record and each instruction.

2. The method of claim 1 wherein the step of generating a unique serial number includes determining a unique alphanumeric sequence and appending a checksum value.

3. The method of claim 1 wherein the step of transmitting the serial number includes sending an email, including the serial number, to an email address associated with the received user information.

4. The method of claim 1 wherein the step of transmitting the serial number includes downloading web page content, including the serial number, for display in a web browser.

5. The method of claim 1 further comprising:
the first requester application including an input screen for entering a serial number; and
receiving the serial number via the input screen.

6. The method of claim 1 further comprising detecting changes in the user information stored in the first user information record, and automatically updating the corresponding record stored in the first requester application data storage after changes to the first user information record are detected.

7. The method of claim 1, wherein receiving at the information management system a request from a first requester application, the request further includes a requester application type indicating at least one of a data format and a protocol of the first requester application, and wherein transmitting to the first requester application further includes transmitting a reply in at least one of a data format and a protocol identified by the requester application type.

8. In a network having a plurality of network devices, an information management system comprising:
a data storage, the data storage including a means of storing a plurality of user accounts, at least one user authentication criteria associated to a user account, at least one user information record associated to a user account, a means of indicating when a user information record has been updated, each request for user information made by each requester application, the record of each request containing at least user identification information associating the request to the user account of the requester, the time of the request, at least one request type, and a requester application identifier; and
an information management server, wherein the information management server is programmed to create a first user account and a first user information record associated to the first user account in the data storage in response to user information received from a first network device, store in the first user information record a first unique serial number, said unique serial number not containing network address information identifying a network address of the information management system or of the first user information record, and transmit the first unique serial number, create a second user account, the second user account storing second user authentication criteria;

receive a request from a first requester application, the request containing second user identification information and second user authentication criteria, at least one request type, and a requester application identifier identifying the first requester application, authenticate the second user request as a request from the second user using the second user authentication criteria and the second user identification information, store a record of the second user request, the record of the request containing at least user identification information associating the record of the request to a user account, the time of the request, at least one request type and a requester application identifier, determine if the second user request contains a request type of at least one of add and update and delete and synchronize, where the second user request contains a request type of add, process the request by identifying at least one serial number associated to the request type, retrieving the user information record associated to the at least one serial number, determining access permissions to each retrieved user information record, and maintaining in at least one of the program memory and the data storage each user information record where access is permitted until a reply is transmitted, where the second user request contains a request type of update, process the request by retrieving the requester application identifier from the request, determining the last time the first requester application sent an update request to the information management system and retrieving each user information record requested by the first requester application with a last updated date occurring after the last time the first requester application sent an update request to the information management system, determining access permissions to each retrieved user information record, and maintaining in at least one of the program memory and the data storage each retrieved user information record where access is permitted until a reply is transmitted, where the second user request contains a request type of synchronize, process the request by identifying each user information request made by at least one requester application of the second user other than the first requester application since a last time the first requester application sent a synchronization request to the information management system, retrieving at least one user information record identified by each information request and an instruction to add or delete a user information record for each user information request, determining access permissions to each retrieved user information record, and maintaining in at least one of the program memory and the data storage each retrieved user information record where access is permitted and each instruction until a reply is transmitted, retrieve from at least one of the program memory and the data storage each user information record and each instruction, and transmit to the first requester application each user information record and each instruction.

9. The information management system of claim 8 wherein the information management server is programmed to receive a request from the first requester application, detect a data format and/or protocol for the first requester application, and transmit a response to the first requester application in a data format and/or protocol compatible with the first requester application.

10. The information management system of claim 8 wherein each record in the request log includes a user identification information field identifying the requesting user and a requester application identifier field, wherein the unique first serial number is received in a request from a first requester application including user identification information and a requester application identifier, and wherein the response to the first requester application includes stored user information associated with a second unique serial number associated with the received user identifier through a record in the request log.

11. The information management system of claim 8, wherein
the information management server is programmed to create a first group record associated to a first user account in the data storage in response to a request to create a group record received from a first network device, store in the first group record a plurality of individual user serial numbers received from the first network device, and store in the first group record a first unique group serial number.

12. The information management system of claim 11 wherein
the information management server is further programmed to receive a request from a requester application for the unique first group serial number, and transmit a response to the requester application including stored user information associated with the individual user serial numbers mapped to the first group serial number.

* * * * *